(12) United States Patent
Donohue et al.

(10) Patent No.: US 8,287,045 B1
(45) Date of Patent: Oct. 16, 2012

(54) HEAD RESTRAINT FOR A VEHICLE CHILD SEAT

(76) Inventors: Thomas P. Donohue, Bruce, WI (US); Brenda M. Donohue, Bruce, WI (US)

( * ) Notice: Subject to any disclaimer, the term of this patent is extended or adjusted under 35 U.S.C. 154(b) by 0 days.

(21) Appl. No.: 13/034,955

(22) Filed: Feb. 25, 2011

(51) Int. Cl.
*A47C 1/10* (2006.01)
(52) U.S. Cl. ........ 297/393; 297/391; 297/464; 297/487; 297/488
(58) Field of Classification Search .................. 297/464, 297/487, 488, 393, 391; 2/171, 311
See application file for complete search history.

(56) References Cited

U.S. PATENT DOCUMENTS

| | | | | |
|---|---|---|---|---|
| 1,883,756 A * | 10/1932 | Bloom | | 2/172 |
| 4,182,322 A * | 1/1980 | Miller | | 5/637 |
| 4,607,885 A * | 8/1986 | del Fierro | | 297/397 |
| 4,707,031 A * | 11/1987 | Meistrell | | 297/393 |
| 5,155,868 A * | 10/1992 | McLean, Jr. | | 2/173.5 |
| 5,437,064 A * | 8/1995 | Hamaguchi | | 2/414 |
| 5,509,144 A * | 4/1996 | Soergel et al. | | 2/195.1 |
| 5,511,854 A * | 4/1996 | Cordia | | 297/393 |
| 5,729,833 A * | 3/1998 | Judge | | 2/195.1 |
| D407,890 S * | 4/1999 | Frank | | D2/884 |
| 6,266,825 B1* | 7/2001 | Floyd | | 2/338 |
| 6,301,716 B1* | 10/2001 | Ross | | 2/171 |
| 6,386,639 B1* | 5/2002 | McMichael | | 297/464 |
| 6,607,245 B1* | 8/2003 | Scher | | 297/393 |
| D482,163 S * | 11/2003 | Brown | | D29/102 |
| 6,799,802 B1* | 10/2004 | Moran | | 297/393 |
| 6,966,321 B2* | 11/2005 | Hess | | 128/870 |
| D538,011 S * | 3/2007 | Yan | | D2/882 |
| D564,134 S * | 3/2008 | Brundage | | D29/102 |
| D568,583 S * | 5/2008 | Niles | | D2/882 |
| 7,530,634 B1* | 5/2009 | Mortazavi et al. | | 297/219.12 |
| 7,628,456 B1* | 12/2009 | Swartz | | 297/464 |
| D615,453 S * | 5/2010 | Spears | | D11/200 |
| 7,740,318 B2* | 6/2010 | Funke et al. | | 297/393 |
| 7,832,802 B2* | 11/2010 | Ehlers et al. | | 297/393 |
| 2005/0268377 A1* | 12/2005 | Massey | | 2/209.13 |
| 2006/0108850 A1* | 5/2006 | Miller | | 297/393 |
| 2006/0225187 A1* | 10/2006 | Wu | | 2/425 |
| 2008/0238174 A1* | 10/2008 | Cinquanta | | 297/397 |

\* cited by examiner

*Primary Examiner* — Laurie Cranmer

(57) ABSTRACT

A head restraint for a vehicle child seat includes an elastic head band, at least two head support straps, a first attachment strap and a second attachment strap. An inner perimeter of the elastic head band is sized to firmly fit around a child's head. One end of each head support strap is attached to one side of the elastic head band and the other end is attached to an opposing side of the elastic head band. One end of the first attachment strap is attached to one side of the elastic head band and one end of the second attachment strap is attached to an opposing side of the elastic head band. First and second releasable attachment devices are formed on the first and second attachment straps. First and second mating releasable attachment devices are preferably attached to opposing sides of a vehicle child seat.

7 Claims, 7 Drawing Sheets

HEAD RESTRAINT FOR A VEHICLE CHILD SEAT

BACKGROUND OF THE INVENTION

1. Field of the Invention

The present invention relates generally to head restraints and more specifically to a head restraint for a vehicle child seat, which helps protect a child's neck from whiplash during a vehicle accident.

2. Discussion of the Prior Art

Vehicle child seats will protect most of a child's body during a vehicle accident. However, a vehicle child seat will not protect a child's neck from whiplash. Further, vehicle child seats will not keep a child's neck in a substantially upright orientation, if the child falls asleep in the vehicle child seat. The child may do damage to their neck, while sleeping in an unsupported and slumped over position. U.S. Pat. No. 6,301,716 to Ross discloses a head support assembly. U.S. Pat. No. 6,607,245 to Scher discloses a head restraint. The Scher patent discloses a cap placed on the head of a child and the cap tethered to a child seat. However, the cap will not stay on a child's head during a vehicle accident.

Accordingly, there is a clearly felt need in the art for a head restraint for a vehicle child seat, which helps protect a child's neck from whiplash during a vehicle accident and which keeps a child's neck in a substantially upright orientation if they fall asleep in the vehicle child seat.

SUMMARY OF THE INVENTION

The present invention provides a head restraint for a vehicle child seat, which keeps a child's neck in a substantially upright orientation if they fall asleep in the vehicle child seat. The head restraint for a vehicle child seat includes an elastic head band, at least two head support straps, a first attachment strap and a second attachment strap. An inner perimeter of the elastic head band is sized to firmly fit around an upper portion of a child's head. A soft pad may be attached to an entire inside perimeter or a portion of the inside perimeter of the elastic head band. One end of each head support strap is attached to one side of the elastic head band and the other end is attached to an opposing side of the elastic head band. The at least two head support straps are equally spaced around the perimeter of the elastic head band. One end of the first attachment strap is attached to one side of the elastic head band and one end of the second attachment strap is attached to an opposing side of the elastic head band. Releasable attachment devices such as hook and loop fasteners are formed on or secured to at least the other ends of the first and second attachment straps. First and second mating releasable attachment devices are preferably attached to opposing sides of the vehicle child seat, such that the other end of the first and second attachment straps may be secured thereto.

In use, the elastic head band is secured around a child's head. The releasable attachment devices on the first and second attachment straps are secured to the first and second mating releasable attachment devices on the vehicle child seat, such that a child's head has some front to back and side to side movement.

Accordingly, it is an object of the present invention to provide a head restraint for a vehicle child seat, which helps protect a child's neck from whiplash during a vehicle accident.

Finally, it is another object of the present invention to provide a head restraint for a vehicle child seat, which keeps a child's neck in a substantially upright orientation if they fall asleep in the vehicle child seat.

These and additional objects, advantages, features and benefits of the present invention will become apparent from the following specification.

DETAILED DESCRIPTION OF THE PREFERRED EMBODIMENTS

Figure 1:
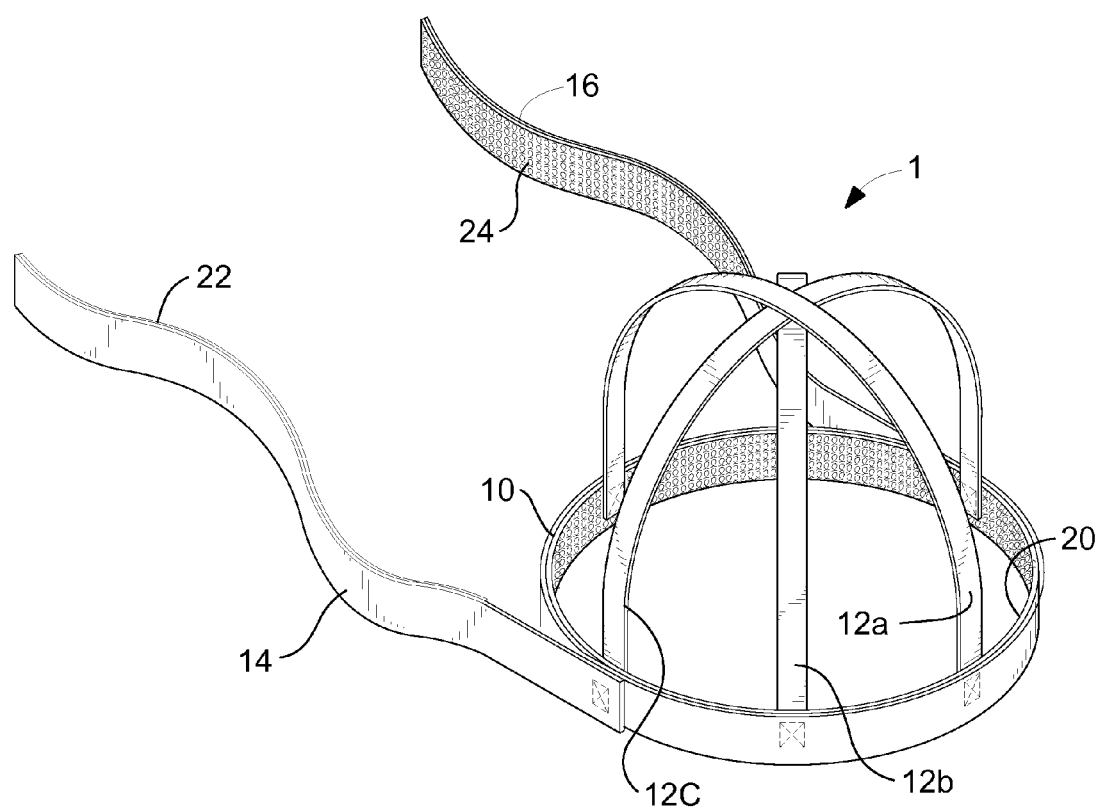
FIG. 1 is a perspective view of a head restraint for a vehicle child seat in accordance with the present invention.
Figure 1A:
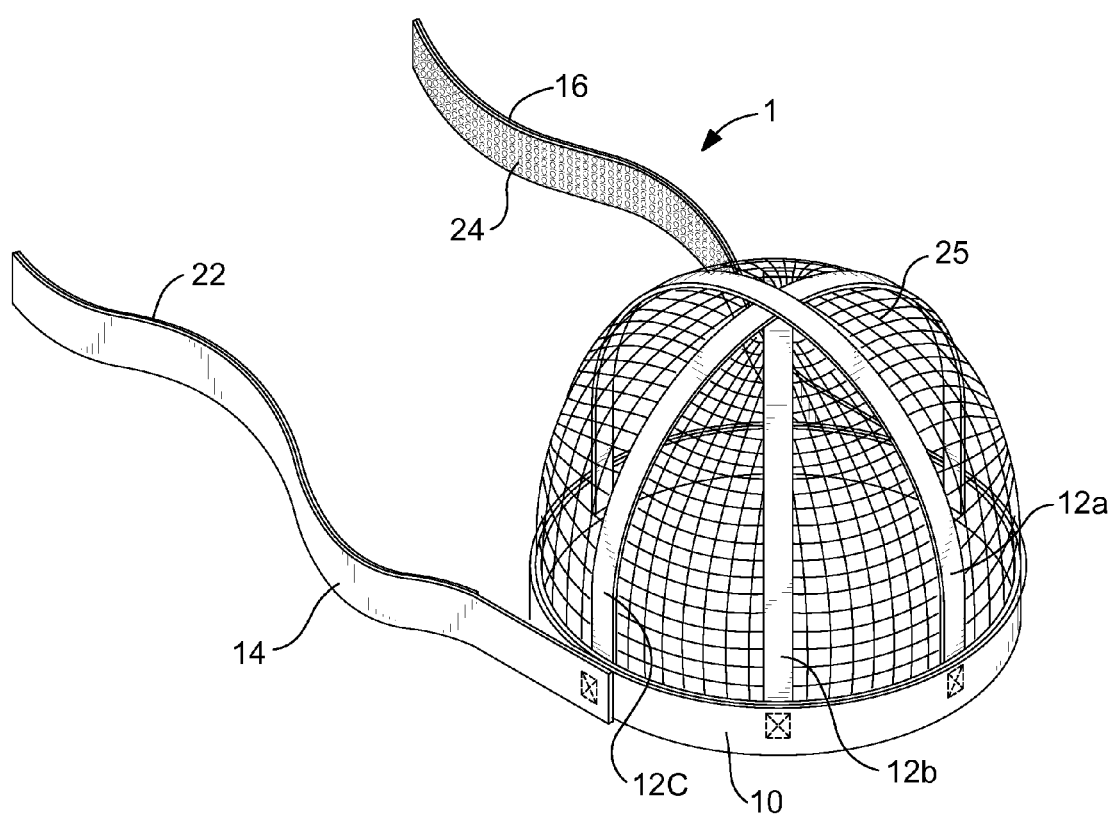
FIG. 1a is a perspective view of a head restraint for a vehicle child seat with a mesh material located under support straps in accordance with the present invention.
Figure 2:
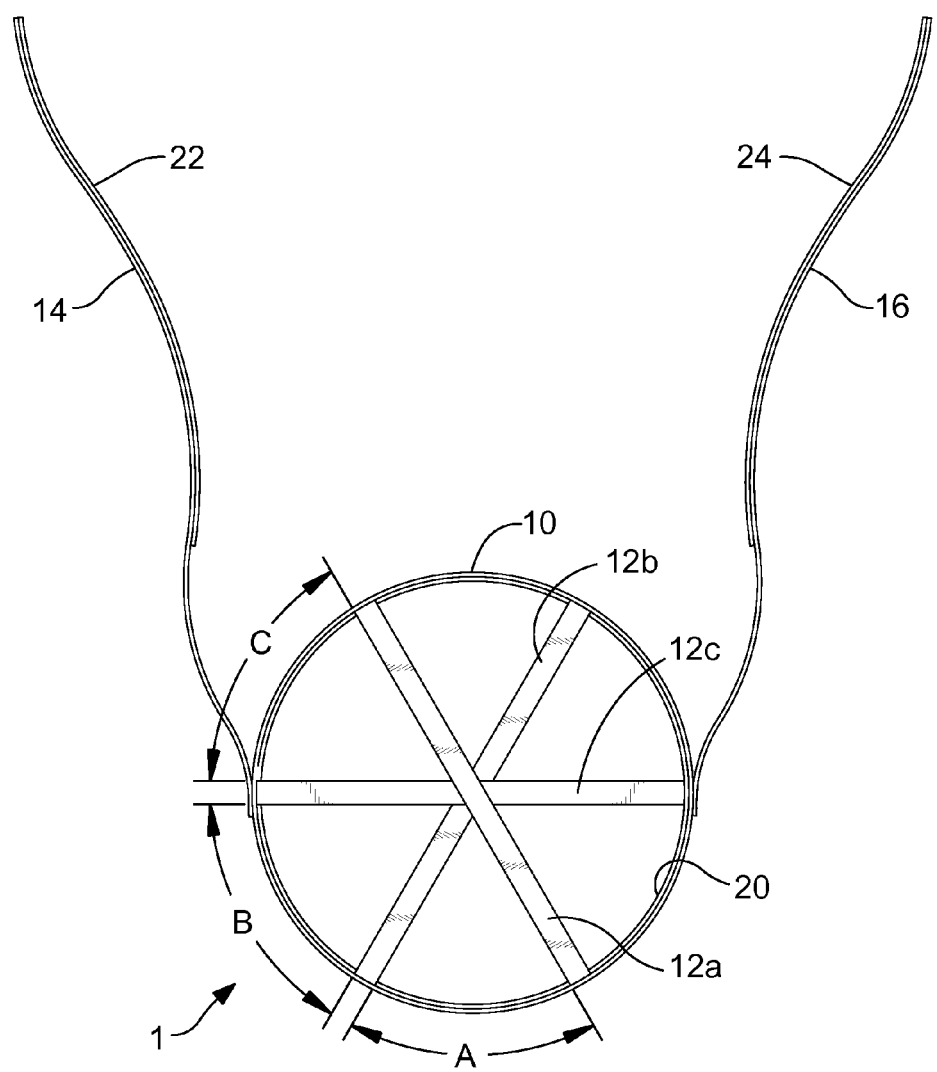
FIG. 2 is a top view of a head restraint for a vehicle child seat in accordance with the present invention.
Figure 3:
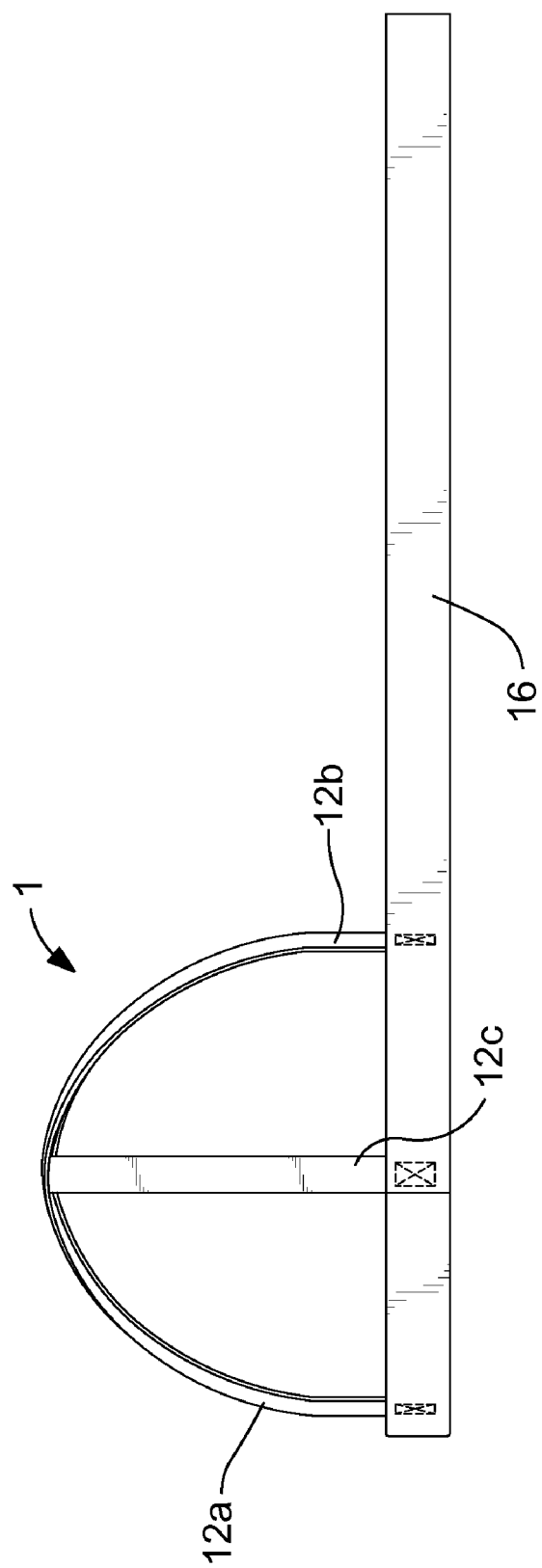
FIG. 3 is a side view of a head restraint for a vehicle child seat in accordance with the present invention.
Figure 4:
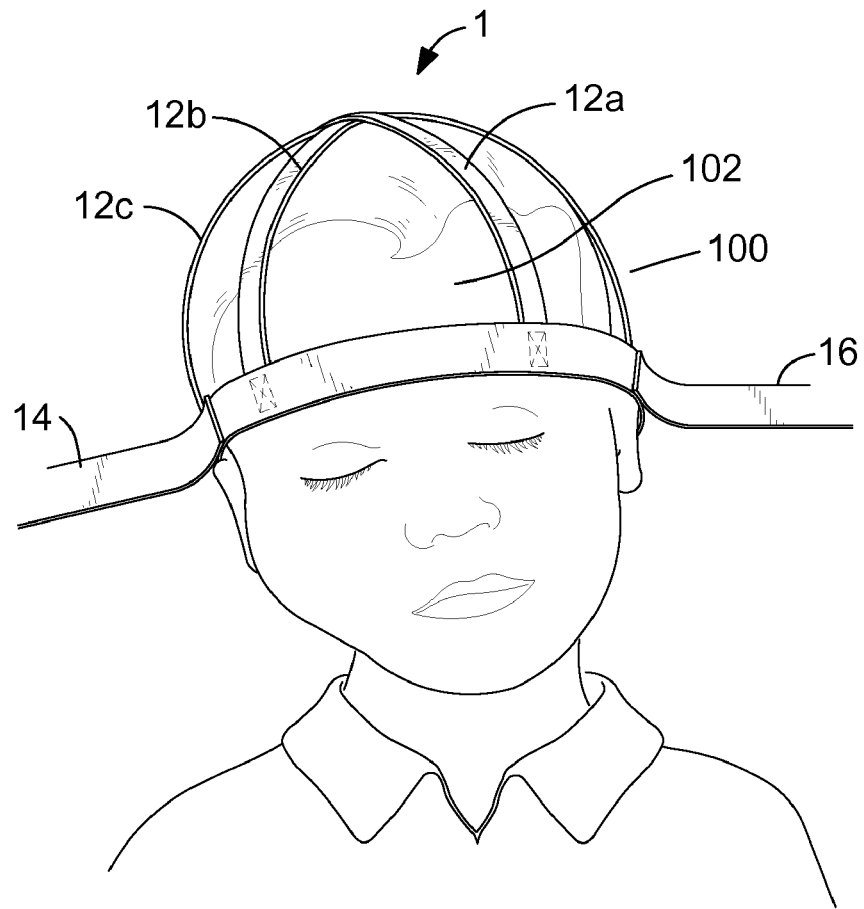
FIG. 4 is an enlarged front view of a child in a vehicle child seat with a head restraint secured to her head in accordance with the present invention.
Figure 5:
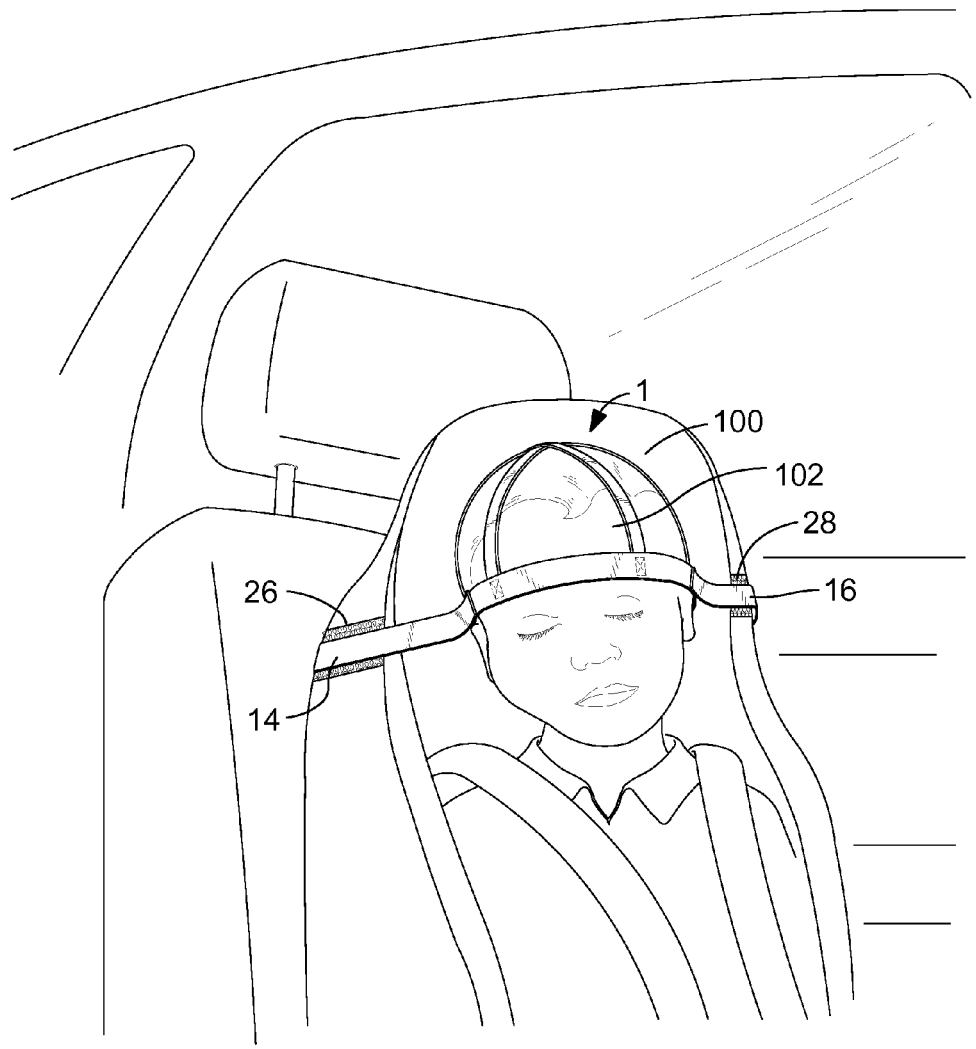
FIG. 5 is a front view of a child in a vehicle child seat with a head restraint secured to her head in accordance with the present invention.
Figure 6:
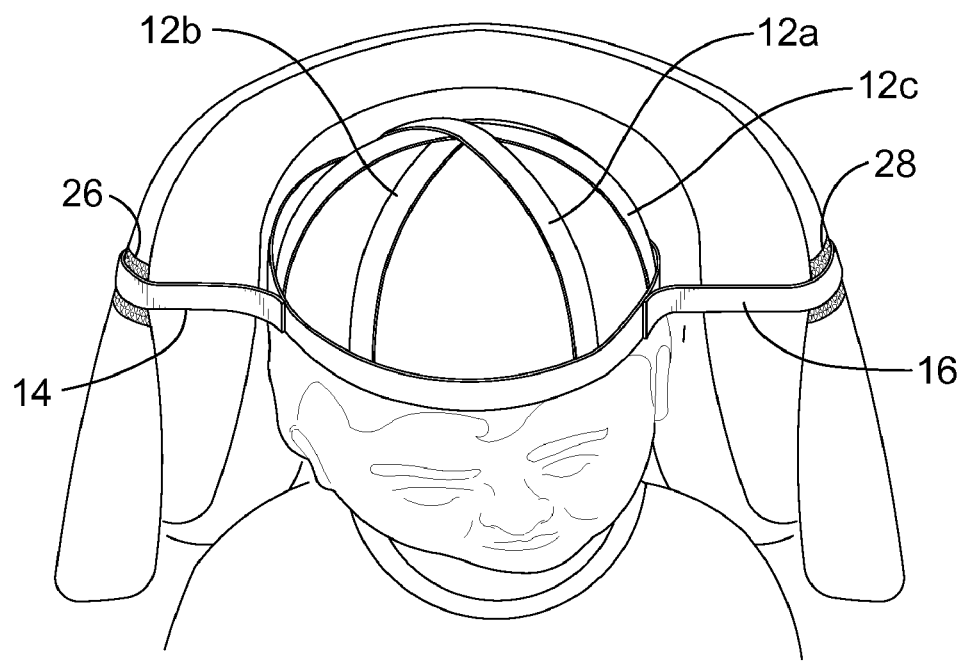
FIG. 6 is a top view of a child in a vehicle child seat with a head restraint secured to her head in accordance with the present invention.

With reference now to the drawings, and particularly to FIG. 1, there is shown a perspective view of a head restraint for a vehicle child seat 1. With reference to FIGS. 2-6, the head restraint for a vehicle child seat 1 includes an elastic head band 10, at least two head support straps 12, a first attachment strap 14 and a second attachment strap 16. An inner perimeter 18 of the elastic head band 10 is sized to firmly fit around an upper portion of a child's head 100. A soft pad 20 may be attached to an entire inside perimeter 18 or a portion of the inside perimeter 18 of the elastic head band 10. The soft pad 20 may be fabricated from any soft natural or synthetic material, such cloth, felt or any other suitable material. It is preferable to at least have the soft pad 20 in the area of the child's forehead 102 to prevent any scratching thereof.

One end of the head support straps 12a, 12b, 12c are attached to one side of the elastic head band 10 and the other end are attached to an opposing side of the elastic head band 10 with sewing, sonic welding or any other suitable process. The head support straps 12a, 12b, 12c are preferably equally spaced around the perimeter of the elastic head band 10, such that angle A=B=C. The head support straps 12a, 12b, 12c are preferably fabricated from a nonelastic material. It has been found that at least two straps 12 are required to prevent strangulation or eye damage if the headband slides over the child's neck or eyes during a vehicle impact. A mesh material 25 is preferably attached to the head support straps 12a, 12b, 12c on an inside surface thereof.

One end of the first attachment strap 14 is attached to one side of the elastic head band 10 with sewing, sonic welding or any other suitable process. One end of the second attachment strap 16 is attached to an opposing side of the elastic head band 10. The first and second attachment straps are preferably fabricated from a non-elastic material. A first releasable attachment device 22, such as a hook and loop fastener pad is secured to or formed on at least the other end of the first attachment strap 14. A second releasable attachment device 16, such as a hook and loop fastener pad is secured to or formed on at least the other end of the second attachment strap 16. A first mating releasable attachment device 26 is preferably attached to one side of a vehicle child seat 104 and a second mating releasable attachment device 28 is preferably attached to the other side of a vehicle child seat 104.

The first releasable attachment device 22 is attached to the first mating releasable attachment device 26 and the second releasable attachment device 24 is attached to the second mating releasable attachment device 28.

In use, the elastic head band 10 is secured around a child's head, such that the at least two head support straps 12 contact a top of the child's head 100. The elastic head band 10 would also be positioned above the child's eyebrows. The first and second releasable attachment devices are secured to the first and second mating releasable attachment devices on the vehicle child seat 104, such that a child's head 100 has some front to back and side to side movement.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A vehicle child seat head restraint comprising:
   a head band being sized to firmly fit around an upper portion of a child's head, said head band is fabricated from an elastic material;
   at least two head support straps fabricated from a non-elastic material, wherein said at least two head support straps comprise at least a first head support strap and a second head support strap, said first head support strap having one end attached to one side of said head band and another end attached to an opposing side of said head band, and said second head support strap having one end attached to one side of said head band at a location spaced from said one end of said first head support strap and another end attached to an opposing side of said head band; and
   a first attachment strap having one end attached to one side of said head band, a second attachment strap having one end attached to an opposing side of said head band, wherein said first and second attachment straps are secured to the vehicle child seat.

2. The vehicle child seat head restraint of claim 1, further comprising:
   a first releasable attachment device is formed on said first attachment strap, a second releasable attachment device is formed on said second attachment strap.

3. The vehicle child seat head restraint of claim 2, further comprising:
   a first mating releasable attachment device is attached to one side of the vehicle child seat, a second mating releasable attachment device is attached to an opposing side of the vehicle child seat, wherein said first attachment device is secured to said first mating releasable attachment device, said second attachment device is secured to said second mating releasable attachment device.

4. The vehicle child seat head restraint of claim 3 wherein:
   said first and second releasable attachment devices are at least one of a hook and loop fastener, said first and second mating releasable attachment devices are at least one of a hook and loop fastener.

5. The vehicle child seat head restraint of claim 3 wherein:
   a mesh material is secured to said at least two head support straps.

6. The vehicle child seat head restraint of claim 1, further comprising:
   a soft pad is secured to at least a portion of an inside perimeter of said head band.

7. The vehicle child seat head restraint of claim 1 wherein:
   said first and second attachment straps are fabricated from a non-elastic material.

* * * * *